United States Patent [19]

Rafanelli et al.

[11] Patent Number: 5,274,494
[45] Date of Patent: Dec. 28, 1993

[54] SPECKLE SUPPRESSION ILLUMINATOR

[75] Inventors: Gerard L. Rafanelli, Fountain Valley, Calif.; Claudio G. Parazzoli, Seattle, Wash.

[73] Assignee: Hughes Aircraft Company, Los Angeles, Calif.

[21] Appl. No.: 4,166

[22] Filed: Jan. 11, 1993

Related U.S. Application Data

[63] Continuation of Ser. No. 691,650, Apr. 25, 1991, abandoned.

[51] Int. Cl.$^5$ .................. G02B 27/48; G03B 41/00
[52] U.S. Cl. ................................. 359/327; 359/124
[58] Field of Search ............. 359/124, 327, 334, 337; 372/3

[56] References Cited

U.S. PATENT DOCUMENTS

| | | | |
|---|---|---|---|
| 4,195,930 | 4/1980 | Delhaye et al. | 356/301 |
| 4,458,994 | 7/1984 | Jain et al. | 354/4 |
| 4,511,220 | 4/1985 | Scully | 372/27 |
| 4,560,881 | 12/1985 | Briggs | 250/458.1 |
| 4,561,019 | 12/1985 | Lizzi et al. | 358/112 |
| 4,851,978 | 7/1989 | Ichihara | 362/268 |
| 4,975,919 | 12/1990 | Amada et al. | 372/33 |
| 5,038,359 | 8/1991 | Pepper et al. | 372/99 |

OTHER PUBLICATIONS

Silverstein et al.; "Frequency and Temporal ... Resolution", Proc. SPIE, vol. 845, pp. 188-189, 1987; abst. only supplied.

Parazzoli et al.; "Stimulated Rotational Raman ..."; Ntis, Mar. 31, 1989; 230 p.; AN DE 89016427/XAB; abstract only.

Jain et al., "Ultrafast Deep UV ... Lasers"; Canute du Colloque Int. Micro., pp. 69-72, 1982; abst. only.

*Primary Examiner*—Nelson Moskowitz
*Attorney, Agent, or Firm*—Michael W. Sales; Wanda K. Denson-Low

[57] ABSTRACT

Disclosed is a method and apparatus for reducing or eliminating the speckle intensity distribution of an imaging and/or tracking system The benefits of utilizing a highly coherent source (12) as an imaging and tracking system are well known. However, such a coherent source (12) provides a speckle intensity distribution which reduces the effective resolution capability of the imaging system. This invention takes a coherent beam of light (14) and impinges it into a Raman cell (16) to obtain a broad spectral bandwidth beam of light having additional side wavelengths other than the original wavelength. In addition, this invention provides a means to improve the beam quality of all of the Raman lines. Therefore, a composite beam having broad spectral bandwidth composed of individual spectral lines having good beam quality is generated. As a result of the broad spectral bandwidth, images formed from targets illuminated by such a composite beam are substantially free of speckle intensity variations.

4 Claims, 1 Drawing Sheet

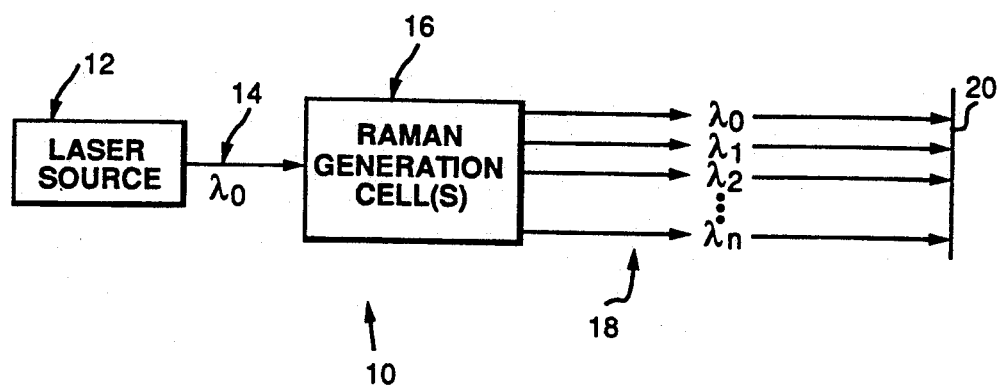
FIG. 1.
FIG. 2.
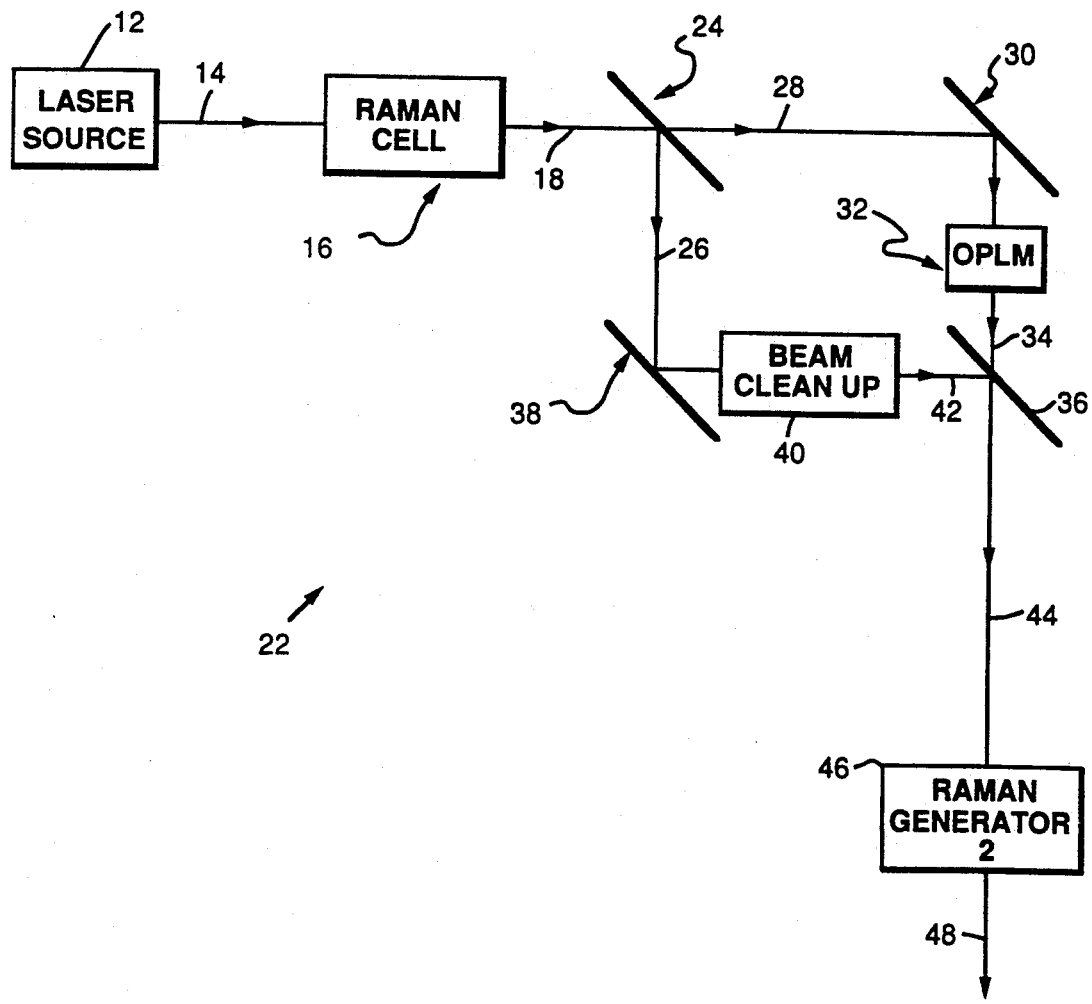

SPECKLE SUPPRESSION ILLUMINATOR

This is a continuation of U.S. application Ser. No. 07/691,650 filed apr. 25, 1991, now abandoned.

BACKGROUND OF THE INVENTION

1. Field of the Invention

This invention relates generally to a laser imaging and/or tracking system, and more specifically, to a laser imaging and/or tracking system incorporating speckle suppression.

2. Description of the Related Art

Coherence of a light beam can be simplistically described as the relationship between different phases of wavelets within the beam. If the phase difference between any pair of wavelets is a constant then the wavelets are perfectly coherent. Coherence can be separated into temporal and spatial coherence, both being a factor of overall beam coherence. Temporal coherence is related to the phase relationship between the various frequencies comprising the spectral bandwidth. The more monochromatic the beam is the greater the temporal coherence. Spatial coherence is related to the phase relationship between the various spatial locations of the wavefront comprising the beam. The higher the degree of transverse spatial coherence the less the beam diverges. While common luminous light sources are incoherent, the light beams emanating from lasers are highly temporally and spatially coherent. Coherent laser beams provide well known advantages for imaging and tracking systems due to the highly directional nature of the laser's propagation characteristics, resulting in efficient energy transfer of the output laser power to the surface of an illuminated target of interest. A basic problem with using highly coherent laser sources as illuminators for active tracking and/or imaging systems is the deleterious effects of random intensity variations, known as speckle, in the image. Speckle originates when a coherent light beam is reflected from or transmitted through an object having root-mean-square (rms) surface height deviations on the same order or scale as the light beam's wavelength. A speckle intensity pattern results at the image plane due to mutually coherent interference between reflected light from different spatial locations of the object. For typical imaging systems, the optical point spread function is large when compared to the surface roughness of the object. Consequently, the image intensity at a specific image point is the aggregation of coherent interference from many different object points. Since the random intensity pattern has a contrast ratio of approximately one (1), and the angular periods of the intensity fluctuations are on the order of the angular resolving power of the optical system, the effective pixel signal to noise ratio due to speckle is approximately one. Therefore, the suppression of speckle is a critical aspect of sensitive image and tracking devices.

One prior art method to suppress speckle in an active imaging system using a laser as an illuminator is the method of frame averaging. Frame averaging requires the acquisition of a plurality of image frames of the scene. For frame averaging to be effective each acquired image must measure a statistically different speckle pattern. The averaging process reduces speckle by approximately the square root of the number or frames, but also degrades image quality due to the induced image blurring caused by the relative target motion required by the frame averaging process. In addition, frame averaging impacts the power requirements for the laser, and eliminates the covert advantage of a single frame short pulse illumination.

What is needed then is a coherent light source imaging system which effectively suppresses speckle without effecting other critical system constraints. It is therefore an object of the present invention to provide such a system.

SUMMARY OF THE INVENTION

Disclosed is a speckle suppression illuminator (SSI) able to produce a broad spectral band, quasi-incoherent, light beam from a coherent laser beam which preserves the propagation characteristics of the laser beam. By producing a light beam which remains substantially spatially coherent, advantages such as minimum beam divergence can still be realized as with the coherent laser beam. The broad spectral band characteristics of the beam will substantially reduce speckle, thus increasing the final image quality and the effective system resolution.

A broad band spectrum or temporal incoherence of the illuminator is obtained by injecting an intense laser beam into a Raman cell. A Raman cell is a chamber containing certain molecules for scattering light in a desirable fashion, and is well known to those skilled in the art. The laser beam induces stimulated rotational Raman scattering (SRRS) and/or stimulated vibrational Raman scattering (SVRS). SRRS and SVRS are inelastic scattering processes that convert pumped laser photons into energy shifted photons. The energy shifted photons are separated into distinct Raman energies at separate wavelengths. The separate wavelengths produce enough temporal incoherence in the beam so that much of the speckle is suppressed.

By the above described illumination method, the SSI provides a means to illuminate an object with short wavelengths thereby providing a day/night capability to generate high resolution imagery, illuminate an object in an energy efficient manner by preserving the highly directional propagation characteristics of a laser beam, and illuminate an object without producing intensity fluctuations in the image, speckle, caused by the coherent illumination of an object by a laser beam.

Additional objects, advantages, and features of the present invention will become apparent from the following description and appended claims, taken in conjunction with the accompanying drawings.

BRIEF DESCRIPTION OF THE DRAWINGS

FIG. 1 is a schematic diagram showing the effect of a RAMAN cell on a laser beam; and FIG. 2 is a schematic diagram showing a preferred embodiment of the present invention.

DETAILED DESCRIPTION OF THE PREFERRED EMBODIMENT

The following description of the preferred embodiment is merely exemplary in nature and is in no way intended to limit the invention or its application or uses.

It is well known that an atom or molecule has a specific number of discreet energy states or levels. The electrons of a particular atom or molecule can only occupy these energy states, and therefore can only have the energies representative of these states. It is further well known that an atom or molecule can absorb a photon having a particular energy represented by $h\nu$, where h is Planck's constant and $\nu$ is the frequency of the photon, and give off the absorbed energy in one form or another.

The following description, taken generally from the Handbook of Physics, Condon L. Odishaw, 2nd Edition, McGraw Hill, gives a basic understanding of the Raman effect. Quantum theoretically, the Raman effect may be regarded as a collision process of photons with molecules. Raman type collisions are inelastic, in which case a photon rebounds off of a molecule with more or less energy than it had prior to the collision. The energy difference of the photon leaving the molecule and the photon colliding with the molecule generally depends on the transition of the electrons of the molecule between different energy levels. The amount of energy difference will be referred to as $\Delta E$. The energy change of the photon results from an energy exchange between the molecule and the photon. If the energy is added or subtracted from the rotational-vibrational energy of the molecule, then $\Delta E$ is related to the change in frequency of the photon by the relation $\Delta \nu = \Delta E/h$. The frequency shift of the Raman lines (added frequencies from the Raman effect) from the incident frequency, $\Delta o$, is $\Delta \nu = \Delta E/h$, i.e. the Raman lines will have frequencies, $\nu o \pm |\Delta E|/h$.

When the scattering is such that the energy is given to the molecules by the photons, the scattered frequency will be on the low-frequency side of the input frequency, and the lines are referred to as Stokes lines. When the scattering is such that the energy is given to the photon by the molecule, the scattered frequency will be on the high-frequency side of the input frequency, and the lines are referred to as Anti-Stokes lines.

Rotational Raman transitions can be observed only for molecules in the gaseous phase, while vibrational Raman transitions may be observed in liquid and solid phases.

Above a certain intensity threshold a process known as stimulated Raman scattering occurs. The stimulated Raman process is similar to the stimulated process in a laser, in that all of the stimulated Raman photons tend to be emitted in the same coherence state. In addition, with a sufficient amount of input energy and intensity each Raman line can be the initiation photon (or pump) for higher order Raman lines. The transverse spatial coherence of the Raman lines will be affected by both the spatial coherence of the input (or pump beam) and any intentionally injected or random (seed) photons present at the Raman line wavelengths.

By the above procedure, a broad band light beam can be created by emitting a high intensity coherent light beam into a cell containing a gas having desirable properties. Some of the light beam will be absorbed and re-emitted at the specific Raman line wavelengths associated with the rotational or vibrational energy of the molecules of the gas. The Raman line wavelengths will be slightly longer or shorter than the wavelength $\lambda$ of the laser beam. Therefore, the temporal coherence of the total beam emitted from the cell will be less than the input laser beam's temporal coherence. By correcting the beam quality of the Raman line wavelengths, the transverse spatial coherence of the individual Raman line beams can be maintained. The final total output beam preserves the transverse spatial coherence of a laser, thereby, minimizing beam divergence. In addition, the total beam's broad spectral band greatly reduces its temporal coherence which minimizes the speckle in the acquired image.

The principles discussed above can be better visualized by considering FIGS. 1 and 2. In FIG. 1, a system 10 incorporates a laser source 12 which emits a monochromatic, highly coherent light beam 14 centered at frequency $\lambda$. As is typical of coherent laser beam sources, light beam 14 further has low divergence, and further, the beam's intensity is designed to be above the stimulated Raman threshold intensity. Light beam 14 impinges a Raman cell 16 which includes a sample gas, such as hydrogen or deuterium or a mixture of both. The stimulated Raman scattering which occurs in Raman cell 16 produces a broad spectral band light beam 18 having a plurality of side wavelengths $\lambda_1, \lambda_2 \ldots \lambda_n$, in addition to the laser frequency $\lambda_o$, represented by the different Raman lines caused by SRRS and/or SVRS. In FIG. 1, beam 18 is impinged on a target plane 20. For some active imaging applications the beam quality of the individual Raman beams is insufficient for good overall system performance. Therefore, the wavefront quality of each Raman line beam must be improved.

The concept as shown in FIG. 1 is incorporated in a system 22 of FIG. 2 to produce high beam quality. In FIG. 2, laser source 12 again emits a highly coherent, monochromatic light beam 14 into a Raman cell 16. Beam 18 emitted from a first Raman cell 16, having the laser source wavelength and the plurality of side wavelengths as discussed above, impinges on a first dichroic mirror 24. Dichroic mirror 24 splits the beam into dual beams 26 and 28. Dichroic mirror 24 has the property, as is well known in the art, of separating a beam according to its wavelengths. Beam 26 includes the Raman wavelengths $\lambda_1, \lambda_2 \ldots \lambda_n$ and is impinged on a mirror 30 to redirect it into an optical path length matching optics (OPLM) 32. Beam 34 is emitted from OPLM 32. Beam 26 is impinged on beam cleanup optics 40. The output beam 42 from the beam cleanup optics 40 is impinged upon a partly silvered mirror 36 along with beam 34 from OPLM 32. Beams 42 and 34 are thus combined into a single beam 44 as shown, which is impinged into a second Raman cell 46 also containing a gas such as hydrogen or deuterium or a mixture of both. Beam output 48 from Raman cell 46 thus has a broad spectral bandwidth nature which reduces the speckle of an image. Beam 48 after reflection from a scattering target is then detected by an imaging system.

First Raman cell 16 is designed to convert only a small fraction of the laser's energy into Raman photons at the scattered wavelengths. These extra wavelengths will be referred to as seed photons. The seed photons of beam 26 are impinged on beam cleanup optics 40 to increase the quality of the photons. To increase the quality of the photons, the wavefronts of beams 26 are appropriately altered, by known means, to improve the wavefront of the seed photons. Path 28 of laser beam 18 is impinged onto the optical path length matching optics 32 to compensate for the time of arrival of beam 28 with beam 42 from the beam cleanup optics 40 to put the beams in an optimal temporal phase with each other. The temporal phase relationship between the Raman seed and pump photons is optimized to enhance the coupling of the output Raman lines to the input seed lines. Beams 34 and 42 are then combined to form a single beam 44 and impinged upon second Raman cell 46 such that the output lines are approximately evenly distributed in intensity and have a range from the lasers wavelength to the maximum number of lines required for the desired level of speckle suppression.

The photons created by Raman cell 16 and redirected by cleanup optics 40 are the seed photons which the stimulated Raman line wavelengths of Raman cell 46 follow. In other words, the Raman line wavelengths created in cell 46, which would normally have the transverse coherence characteristics of Raman lines produced in cell 16, tend to follow the wavefronts of the seed photons at the corresponding wavelengths within beam 44 which have been cleaned up, and are thus of good quality. By the use of stimulated Raman scattering, good beam quality can be achieved using the seed photons over that which could be achieved by an unseed process.

This invention, therefore, provides a beam composed of many short wavelengths with high transverse spatial coherence, for both day and night applications, and which has enough temporal incoherence to substantially eliminate speckle without substantially effecting beam intensity.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A system for actively illuminating or tracking a target at a distance in a day or night environment, said system including:

a source of coherent light at a first wavelength; and
    a first RAMAN cell having a gas for receiving said coherent light and for emitting light at said first wavelength and a plurality of side wavelengths to provide a beam having spatial coherence and temporal incoherence sufficient to illuminate or track said target in a day or night environment at said distance with substantial elimination of speckle.

2. The system of claim 1 further including:

a beam clean up device for receiving said plurality of said wavelengths to alter the wavefronts of said side wavelengths.

3. The system of claim 1 further including:

a second RAMAN cell for receiving said first and said plurality of side wavelengths and for providing said beam to illuminate to track said target.

4. A system for actively illuminating or tracking a target at a distance in a day or night environment comprising:

a source of coherent light at a first wavelength;
    a first RAMAN cell having a gas for receiving said coherent light and for emitting light at said first wavelength and a plurality of side wavelengths
    means for splitting said first wavelength from said plurality of side wavelengths;
    a beam clean-up device for receiving said plurality of side wavelengths to alter the wavefronts to provide clean-up side wavelengths;
    means for recombining said first wavelength and said cleaned-up side wavelengths; and
    a second RAMAN cell having a gas for receiving said first wavelength and said plurality of cleaned-up side wavelengths and for providing a beam having spatial coherence and temporal incoherence sufficient to illuminate or track said target in a day or night environment at said distance with substantial elimination of speckle.

* * * * *